(12) United States Patent
Lomayev et al.

(10) Patent No.: US 10,587,442 B2
(45) Date of Patent: Mar. 10, 2020

(54) ENHANCED MULTIPLE INPUT MULTIPLE OUTPUT PREAMBLE FRAME

(71) Applicants: Artyom Lomayev, Nizhny Novgorod (RU); Alexander Maltsev, Nizhny Novgorod (RU); Yaroslav P. Gagiev, Nizhny Novgorod (RU); Assaf Kasher, Haifa (IL); Michael Genossar, Modiin (IL); Carlos Cordeiro, Portland, OR (US)

(72) Inventors: Artyom Lomayev, Nizhny Novgorod (RU); Alexander Maltsev, Nizhny Novgorod (RU); Yaroslav P. Gagiev, Nizhny Novgorod (RU); Assaf Kasher, Haifa (IL); Michael Genossar, Modiin (IL); Carlos Cordeiro, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 82 days.

(21) Appl. No.: 15/279,914

(22) Filed: Sep. 29, 2016

(65) Prior Publication Data
US 2017/0324599 A1 Nov. 9, 2017

Related U.S. Application Data

(60) Provisional application No. 62/331,068, filed on May 3, 2016.

(51) Int. Cl.
*H04L 27/26* (2006.01)
*H04B 7/0413* (2017.01)
(Continued)

(52) U.S. Cl.
CPC ......... *H04L 27/2613* (2013.01); *H04B 1/38* (2013.01); *H04B 7/0413* (2013.01); *H04L 27/2602* (2013.01); *H04W 88/04* (2013.01)

(58) Field of Classification Search
CPC .......... H04L 27/2613; H04L 27/2602; H04B 7/0413; H04B 1/38; H04W 88/04
See application file for complete search history.

(56) References Cited

U.S. PATENT DOCUMENTS

2005/0163236 A1* 7/2005 Hammerschmidt . H04B 7/0671
375/260
2016/0164800 A1* 6/2016 Eitan ..................... H04L 47/80
370/389

(Continued)

*Primary Examiner* — Jeffrey M Rutkowski
*Assistant Examiner* — Chae S Lee
(74) *Attorney, Agent, or Firm* — Eversheds Sutherland (US) LLP

(57) ABSTRACT

This disclosure describes systems, methods, and devices related to an enhanced multiple input multiple output (MIMO) preamble frame. A device may determine a MIMO frame including a first section and a second section. The device may generate an enhanced MIMO frame including at least in part a modified first section and the second section of the MIMO frame. The device may determine a first stream and a second stream associated with at least one antenna of the device. The device may cause to send the enhanced MIMO frame to one or more first devices on the first stream. The device may cause to send the MIMO frame to the one or more first devices on the second stream.

16 Claims, 10 Drawing Sheets

(51) Int. Cl.
*H04B 1/38* (2015.01)
*H04W 88/04* (2009.01)

(56) References Cited

U.S. PATENT DOCUMENTS

| | | | |
|---|---|---|---|
| 2016/0241315 A1* | 8/2016 | Kwon | H04B 7/0452 |
| 2016/0309457 A1* | 10/2016 | Eitan | H04L 1/0079 |
| 2017/0187439 A1* | 6/2017 | Park | H04B 7/0617 |
| 2017/0201975 A1* | 7/2017 | Yang | H04W 72/046 |
| 2017/0257201 A1* | 9/2017 | Eitan | H04B 7/0413 |
| 2018/0367650 A1* | 12/2018 | Motozuka | H04B 7/0695 |

* cited by examiner

ENHANCED MULTIPLE INPUT MULTIPLE OUTPUT PREAMBLE FRAME

CROSS-REFERENCE TO RELATED APPLICATIONS

This application claims the benefit of U.S. Provisional Application No. 62/331,068 filed May 3, 2016, the disclosure of which is incorporated herein by reference as if set forth in full.

TECHNICAL FIELD

This disclosure generally relates to systems and methods for wireless communications and, more particularly, to an enhanced multiple input multiple output (MIMO) preamble frame format.

BACKGROUND

Wireless devices are becoming widely prevalent and are increasingly requesting access to wireless channels. The growing density of wireless deployments requires increased network and spectrum availability. Wireless devices may communicate with each other using directional transmission techniques including, but not limited to, beamforming techniques. Wireless devices may communicate over a next generation 60 GHz (NG60) network, an enhanced directional multi-gigabit (EDMG) network, and/or any other network.

DETAILED DESCRIPTION

Figure 1:
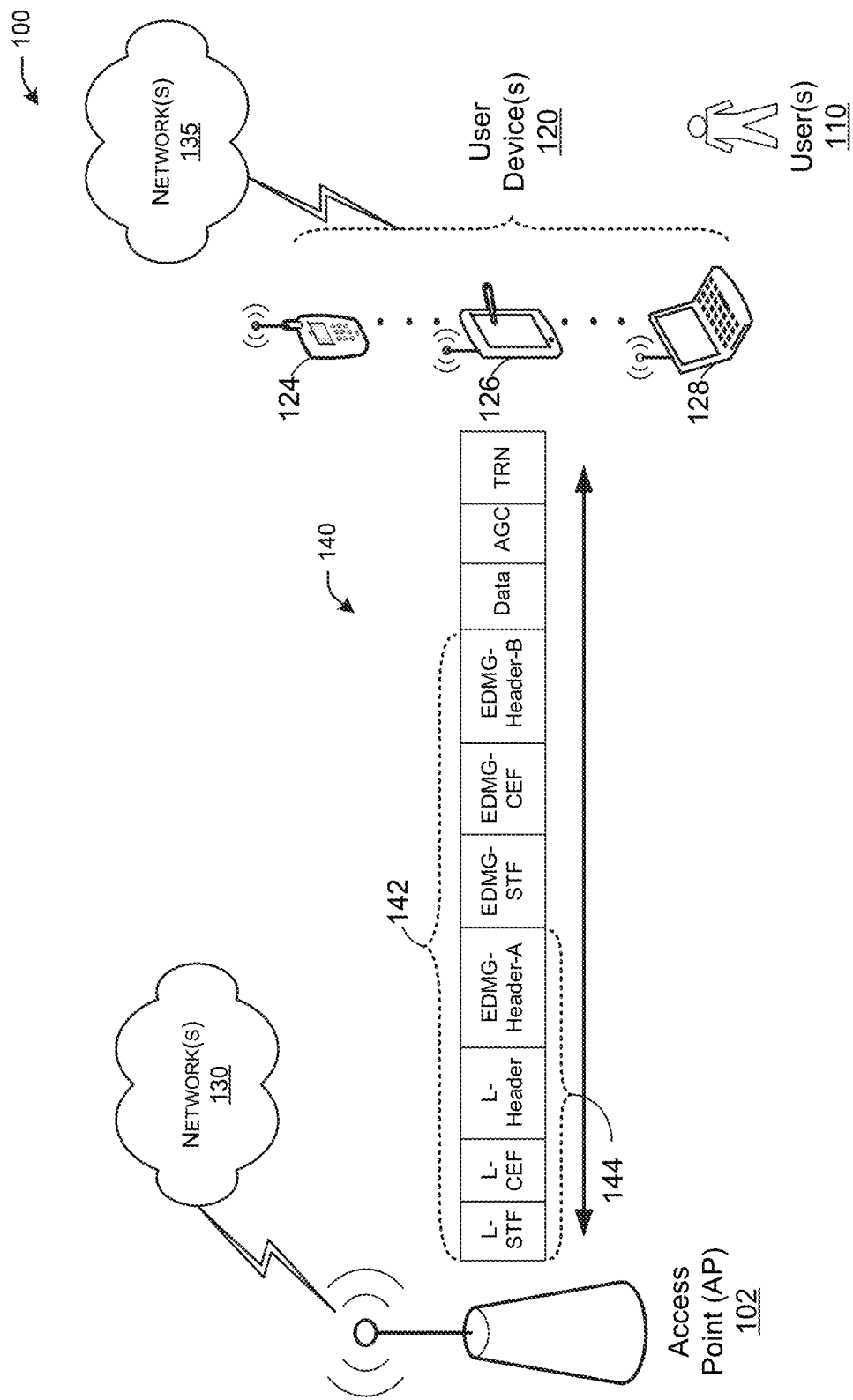
FIG. 1 depicts a network diagram illustrating an example network environment for an enhanced multiple input multiple output (MIMO) preamble frame format, in accordance with one or more example embodiments of the present disclosure.

Example embodiments described herein provide certain systems, methods, and devices for an enhanced multiple input multiple output (MIMO) preamble frame format. The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Devices may communicate over a next generation 60 GHz (NG60) network, an enhanced directional multi-gigabit (EDMG) network, and/or any other network. Devices operating in EDMG may be referred to herein as EDMG devices. This may include user devices and/or APs or other devices capable of communicating in accordance with a communication standard including, but not limited to, IEEE 802.11ad and/or IEEE 802.11ay.

A typical enhanced EDMG PPDU frame format may be composed of a legacy preamble, a legacy header, an EDMG-Header-A containing SU-MIMO parameters, an EDMG short training field (EDMG-STF), an EDMG channel estimation field (EDMG-CEF), an EDMG-Header-B containing multi-user (MU)-MIMO parameters, a payload data part, an optional automatic gain control (AGC), and beamforming training units appended at the end of the frame. The legacy preamble, the legacy header and a new EDMG-Header-A may be transmitted using single input single output (SISO) single carrier (SC) physical layer (PHY) modulation. This provides an opportunity for the legacy directional multi-gigabit (DMG) devices to decode the legacy header and identify (using a signaling bit) that the frame contains the EDMG part not compatible with its implementation. This realizes a backward compatibility requirement. At the same time, the EDMG devices can decode the EDMG-Header-A using SISO SC PHY modulation and extract the required parameters for MIMO frame reception. The transmission of the rest of the EDMG frame may be done using MIMO modulation.

Example embodiments of the present disclosure relate to systems, methods, and devices for an enhanced MIMO preamble frame format.

A DMG communication may involve one or more directional links to communicate at a rate of multiple gigabits per second, for example, at least 1 gigabit per second, 7 gigabits per second, or any other rate. An amendment to a DMG operation in a 60 GHz band, e.g., according to an IEEE 802.11ad standard, may be defined, for example, by an IEEE 802.11ay project.

In some demonstrative embodiments, one or more devices may be configured to communicate over a next generation 60 GHz (NG60) network, an enhanced DMG (EDMG) network, and/or any other network. For example, the one or more devices may be configured to communicate over the NG60 or EDMG networks.

In one embodiment, an enhanced MIMO preamble frame system may determine a preamble frame format for MIMO such that it may be used during communications between one or more devices (e.g., access points, user devices, etc.) with minimal interference between streams.

In one embodiment, the enhanced MIMO preamble frame system may facilitate one or more options that may be defined for the transmission of the legacy part and EDMG-Header-A using legacy SC modulation from a transmitting device. The selected option may depend at least in part on the antenna type used. In one embodiment, a first option may be to have the legacy L-STF, the L-CEF, the L-Header, and new EDMG-Header-A transmitted from one of the antennas, which has the best beamforming settings (e.g., quality of the link). This option has the advantage of not introducing interference during SISO transmission of the legacy part of the preamble, L-Header and EDMG-Header-A. In this case, the legacy L-STF, the L-CEF, and the L-Header would not be transmitted on the other antennas of the transmitting device.

In another embodiment, the enhanced MIMO preamble frame system may determine that a second option may be to have the legacy L-STF, the L-CEF, the L-Header, and the new EDMG-Header-A transmitted from all antennas of the transmitting device concurrently; however, relative circular shift (Tshift) may be applied for the signals transmitted in different streams. The Tshift may be selected by a device to be a multiple of chip duration. A circular shift is the operation of rearranging the entries either by moving the final entry to the first position, while shifting all other entries to the next position, or by performing the inverse operation. Introducing a circular shift to one of the streams may prevent signal interference between different antennas. This option does not introduce a signal "gap" or "quiet" interval at the beginning of the preamble. Further, the introduction of the circular shift prevents the inter-stream interference. However, it may create multipath channel propagation even for the LOS transmission. The interference issue may be solved at the expense of the multipath propagation in that case.

In one embodiment, the enhanced MIMO preamble frame system may determine that the Tshift may be a parameter, which may be selected based at least in part on the antenna configuration used for the device. For example, if the antennas use orthogonal polarizations, horizontal/vertical (H/V), then the circular shift may be applied equal to zero (e.g., Tshift=0).

In one embodiment, the enhanced MIMO preamble frame system may facilitate shifting the signal of a first stream by a first time duration (e.g., Tshift). The signal of a second stream may be shifted by a time duration that may be a multiple of the first time duration. That is, in the case of M streams, each stream may be shifted by (M−1)×Tshift.

In one embodiment, in the case of a stream that is divided into one or more channels, the enhanced MIMO preamble frame system may facilitate the application of a time shift within the stream for each of its one or more channels.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment, in accordance with one or more example embodiments of the present disclosure. Wireless network 100 may include one or more user device(s) 120 and one or more access point(s) (AP) 102, which may communicate in accordance with IEEE 802.11 communication standards, such as the IEEE 802.11ad and/or IEEE 802.11ay specifications. The user device(s) 120 may be referred to as stations (STAs). The user device(s) 120 may be mobile devices that are non-stationary and do not have fixed locations. Although the AP 102 is shown to be communicating on multiple antennas with user devices 120, it should be understood that this is only for illustrative purposes and that any user device 120 may also communicate using multiple antennas with other user devices 120 and/or AP 102.

One or more illustrative user device(s) 120 and/or AP 102 may be operable by one or more user(s) 110. The user device(s) 120 (e.g., 124, 126, or 128) and/or AP 102 may include any suitable processor-driven device including, but not limited to, a mobile device or a non-mobile, e.g., a static, device. For example, user device(s) 120 and/or AP 102 may include, a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices such as lamps, climate control, car components, household components, appliances, etc. may also be included in this list.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennas. The one or more communications antennas may be any suitable type of antennas corresponding to the communications protocols used by the user device(s) 120 (e.g., user devices 124, 126 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP 102.

Any of the user device(s) 120 (e.g., user devices 124, 126, 128), and AP 102 may be configured to perform directional transmission and/or directional reception in conjunction with wirelessly communicating in a wireless network. Any of the user device(s) 120 (e.g., user devices 124, 126, 128), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP 102 may be configured to perform any given directional transmission towards one or more defined transmit sectors. Any of the user device(s) 120 (e.g., user devices 124, 126, 128), and AP 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP 102 may be configured to use all or a subset of its one or more communications antennas to perform MIMO beamforming.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Some demonstrative embodiments may be used in conjunction with a wireless communication network communicating over a frequency band of 60 GHz. However, other embodiments may be implemented by utilizing any other suitable wireless communication frequency bands, for example, an extremely high frequency (EHF) band (the millimeter wave (mmWave) frequency band), a frequency band between 20 GHz and 300 GHz, a WLAN frequency band, a WPAN frequency band, a frequency band according to the WGA specification, and the like.

The phrases "directional multi-gigabit (DMG)" and "directional band (DBand)," as used herein, may relate to a frequency band wherein the channel starting frequency is above 45 GHz. In one example, DMG communications may involve one or more directional links to communicate at a rate of multiple gigabits per second, for example, at least 1 gigabit per second, 7 gigabits per second, or any other rate.

In some demonstrative embodiments, the user device(s) 120 and/or the AP 102 may be configured to operate in accordance with one or more specifications, including one or more IEEE 802.11 specifications, (e.g., an IEEE 802.11ad specification, an IEEE 802.11ay specification, and/or any other specification and/or protocol). For example, an amendment to a DMG operation in the 60 GHz band, according to an IEEE 802.11ad standard, may be defined, for example, by an IEEE 802.11ay project.

In one embodiment, and with reference to FIG. 1, there is shown a general frame format for the EDMG PPDU 140. The preamble 142 of the EDMG PPDU 140 includes, at least in part, a legacy short training field (STF), a legacy channel estimation field (CEF), a legacy header (L-Header), a new EDMG-Header-A, an EDMG-STF, an EDMG-CEF, and an EDMG-Header-B. Besides the preamble 142, the EDMG PPDU 140 may include a data, an optional automatic gain control (AGC), and beamforming training units (TRNs). It is understood that the above acronyms may be different and are not to be construed as a limitation because other acronyms may be used for the fields included in an EDMG PPDU 140.

In one embodiment, a number of fields (e.g., fields 144) of the preamble 142 may be transmitted using SISO SC PHY modulation. Fields 144 may be offset during transmissions from the antennas of the AP 102 using multiple streams. For example, if AP 102 transmits on two antennas using two streams (e.g., stream 1 and stream 2), the fields 144 for stream 1 may be offset by a Tshift parameter in order to minimize interference between the two streams.

In one embodiment, in the case of multiple stream transmissions, the EDMG PPDU 140 may be transmitted on one spatial stream of one antenna, while the other streams do not transmit to the fields 144. That is, the fields 144 may only be sent on one spatial stream of one antenna. The antenna may be selected based on having the best beamforming settings (e.g., quality of the link). This option has the advantage of not introducing interference during the SISO transmission of the legacy part of the fields 144.

It is understood that the above descriptions are for purposes of illustration and are not meant to be limiting.

Figure 2:
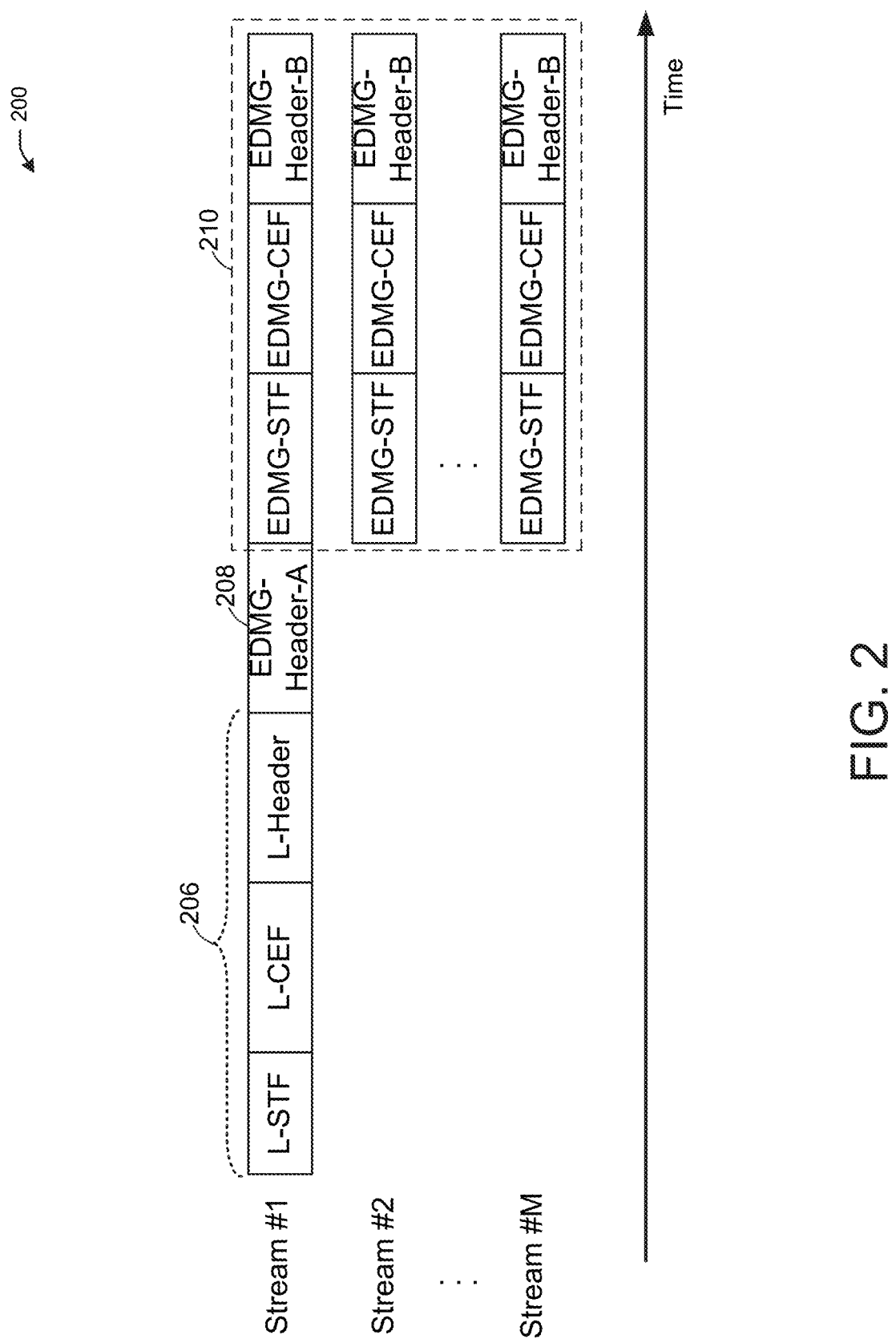
FIG. 2 depicts an illustrative schematic diagram for an enhanced MIMO preamble frame format, in accordance with one or more example embodiments of the present disclosure.

FIG. 2 depicts an illustrative schematic diagram for an enhanced MIMO preamble frame 200, in accordance with one or more example embodiments of the present disclosure.

Referring to FIG. 2, there is shown multiple stream transmissions of an EDMG PPDU between a transmitting device (e.g., the user devices 120 and/or the AP 102 of FIG. 1) and one or more receiving devices (e.g., the user devices 120 and/or the AP 102 of FIG. 1). In this case, the legacy field 206 of the preamble and the EDMG-Header-A 208 are transmitted for one of the streams (or antennas) only (e.g., stream #1). FIG. 2 shows the first option of the EDMG preamble structure for M×N MIMO configuration. Further, fields 210 are sent on each of the streams (or antennas). In this example, fields 210 are sent on stream #1, stream #2, . . . , stream # M, where M is equal to the number of streams or antennas on the device. This prevents interference from other streams (or antennas) when the SISO reception is performed.

In one embodiment, a receiving device may identify the MIMO frame (e.g., the EDMG PPDU). The receiving device may determine that a first section of the MIMO frame is received only on a first stream (e.g., stream #1). The receiving device may decode or otherwise identify that the first section of the MIMO frame includes at least in part the fields 206 and 208. Further, the receiving device may decode or otherwise identify that the second portion of the MIMO frame, including EDMG-STF, EDMG-CEF, and EDMG-Header-B are also received from stream #1. In the example of FIG. 2, there are M streams. The receiving device may determine that the fields 206 and 208 are only received on stream #1. Further, the receiving device may determine that the fields 210, including at least in part EDMG-STF, EDMG-CEF, and EDMG-Header-B are received on stream #2 to stream # M. It is understood that the above descriptions are for purposes of illustration and are not meant to be limiting.

Figure 3:
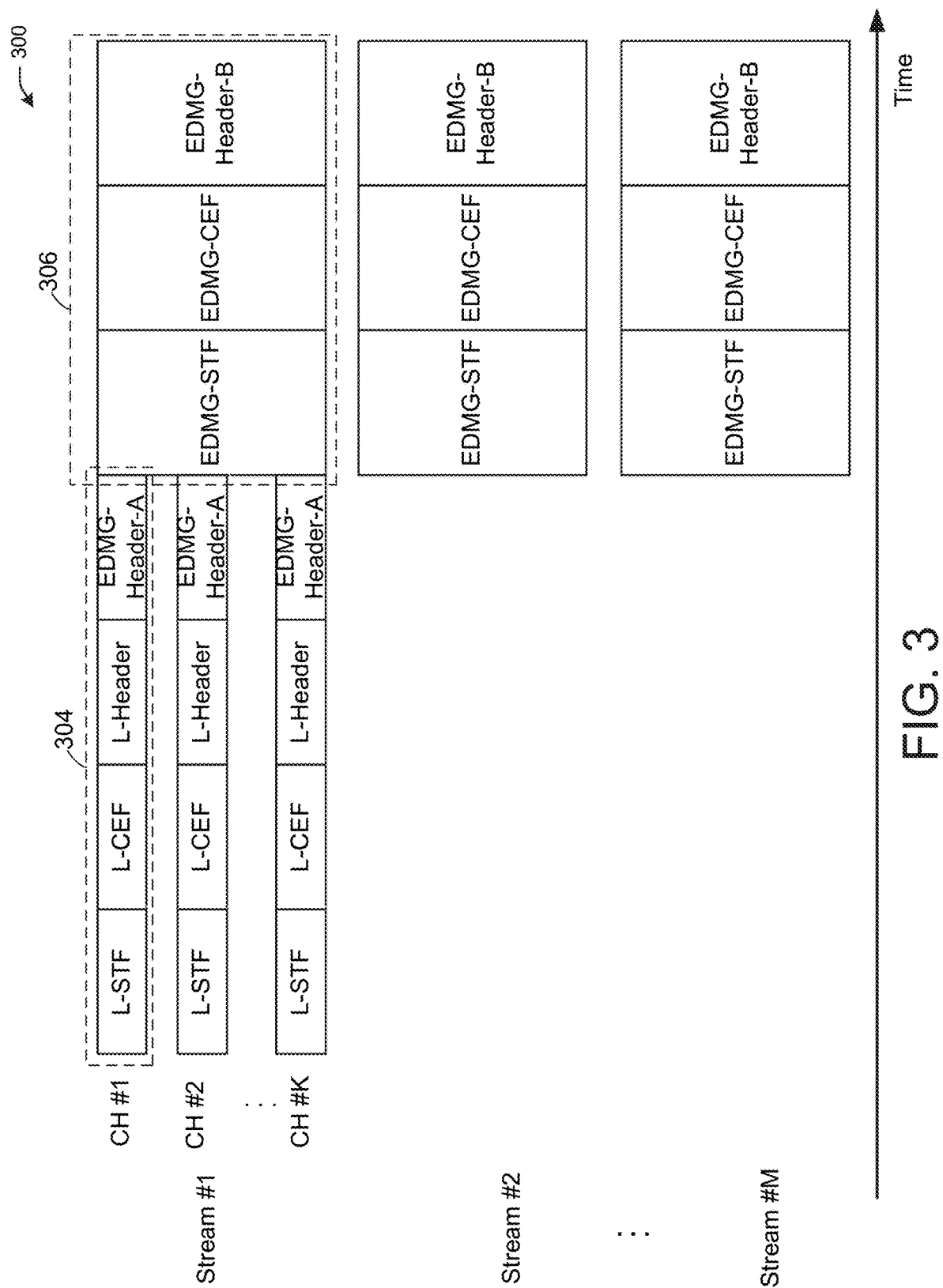
FIG. 3 depicts an illustrative schematic diagram for an enhanced MIMO preamble frame format, in accordance with one or more example embodiments of the present disclosure.

FIG. 3 depicts an illustrative schematic diagram for an enhanced MIMO preamble frame 300, in accordance with one or more example embodiments of the present disclosure.

In FIG. 3, during transmissions between a transmitting device and at least one receiving device, multiple streams (e.g., streams #1 to M, M being an integer value) may be established for transmissions between these devices. For example, in the case of MIMO, multiple antennas and streams may be allocated to be used for transmissions between the devices. In that case, an EDMG PPDU frame may be sent from the transmitting device to the at least one receiving device. An enhanced MIMO preamble frame system may facilitate the transmitting device to send the EDMG PPDU frame on these multiple streams. That is, the fields 304, including the L-STF, L-CEF, L-Header, and EDMG-Header-A may be transmitted in the stream #1 only.

In one embodiment, the enhanced preamble frame may be simply generalized for the channel bonding case. FIG. 3 shows the EDMG preamble structure for the case of channel bonding of K frequency channels in the general case. That is, in stream #1, K frequency channels may be allocated such that the fields 304 may be sent on each channel. The fields 304 may be transmitted in all K frequency channels of stream #1. However, the transmission of fields 304 is performed only in stream #1. Alternatively, it can be transmitted in the stream with index "i", where i=1-M. The only limitation is that it should be transmitted in only one of the streams in order to minimize interference. Note that starting from the EDMG-STF field of fields 306, the transmission is performed in the full band combining all K frequency channels for stream #1. Further, fields 306 are transmitted on stream #1 and the remaining streams (e.g., stream #2 to stream # M). It is understood that the above descriptions are for purposes of illustration and are not meant to be limiting.

In one embodiment, a receiving device may identify the MIMO frame (e.g., EDMG PPDU). The receiving device may determine that a first section (e.g., fields 304) of the MIMO frame is received only on a first stream (e.g., stream #1). However, since in this case stream #1 included K frequency channels, the receiving device may decode or otherwise identify that the first section of the MIMO frame is received on the K frequency channels of stream #1. This includes the fields 304 being received on the K frequency channels. In the example of FIG. 3, there are M streams. The receiving device may determine that the fields 304 are only received on stream #1 (and its K frequency channels) but not on the other streams (e.g., stream #2 to stream # M). Further, the receiving device may determine that the fields 306 including, at least in part, EDMG-STF, EDMG-CEF, and EDMG-Header-B, are received on stream #1 to stream # M. It is understood that the above descriptions are for purposes of illustration and are not meant to be limiting.

Figure 4:
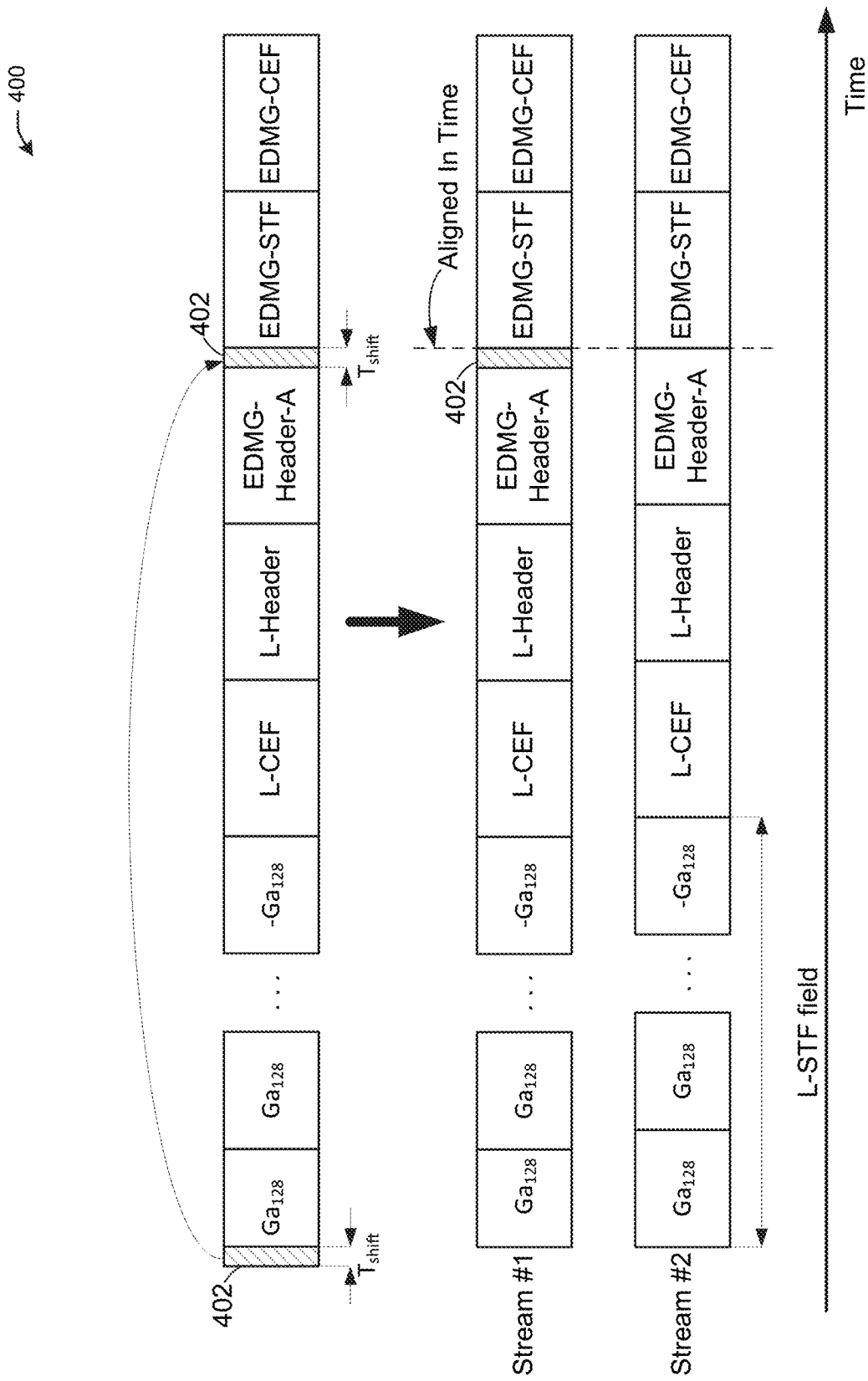
FIG. 4 depicts an illustrative schematic diagram for an enhanced MIMO preamble frame format, in accordance with one or more example embodiments of the present disclosure.

FIG. 4 depicts an illustrative schematic diagram for an enhanced MIMO preamble frame 400, in accordance with one or more example embodiments of the present disclosure.

FIG. 4 shows a time shift may be applied by moving a part of the L-STF field of a MIMO frame (e.g., the EDMG frame). FIG. 4 shows the second option, which may define the preamble structure when the legacy part of the preamble, L-Header and EDMG-Header-A are transmitted in all streams (or antennas) concurrently. In that case, a circular time shift (Tshift) is applied between the streams.

The purpose of the time shift is to prevent interference between the antennas and to prevent unintentional beamforming since each stream is unsynchronized with the other streams. Further, the time shift may not be needed for the single antenna array with orthogonal (V/H) polarizations or dual arrays transmitting with different polarizations.

In one embodiment, considering the time circular shift operation by example of a 2×N MIMO configuration, where 2 indicates the usage of two streams (e.g., stream #1, and stream #2). The L-STF may be composed of the Golay sequence Ga repetitions for the SC PHY and Gb sequence repetitions for the control PHY, each of length 128 chips taken at the 1.76 GHz sample rate. The time shift (Tshift) may be defined in the chip units. The part of the Ga or Gb sequence at the beginning of the preamble (e.g., portion 402) may be moved to the end after the EDMG-Header-A (e.g., portion 402). This may correspond to the circular shift to the right. Note that starting from the EDMG-STF field the corresponding signals in both streams are aligned in time.

In one embodiment, the circular time shift (Tshift) duration should meet the following requirements. The total duration of the circular time shift for an 8-stream transmission (maximum number of streams defined for the SU-MIMO in IEEE 802.11ay) should not exceed a half of the guard interval (GI) duration. The Tshift value should be enough to reduce the impact of interference. Channel frequency selectivity issues should be considered to avoid the impact on packet detection and header decoding. In one embodiment, the Tshift may be an even number in order to have an integer number of samples for orthogonal frequency division multiplexing (OFDM) after a 1.5× sampling rate conversion. The most appropriate values may be 0, 2, 4, 6, and 8 chips. For example, the Tshift may be selected by the device to be equal to 4 cycles.

In one embodiment, a receiving device may identify the MIMO frame (e.g., the EDMG PPDU). In the example of FIG. 4, the receiving device may determine that the MIMO frame received from stream #1 has a Tshift, such that a portion of the Golay sequence of the L-STF field has been moved to the end of the first portion of the MIMO frame. The first portion includes at least in part the L-STF, L-CEF, L-Header, and EDMG-Header-A fields. The receiving device may also determine that the MIMO frame received from stream #2 does not have a Tshift. Further, the receiving device may determine that the second portion of the MIMO frame that includes, at least in part, EDMG-STF, EDMG-CEF, and other fields that may be included in the MIMO frame, are aligned in time between stream #1 and stream #2. It is understood that the above descriptions are for purposes of illustration and are not meant to be limiting.

Figure 5:
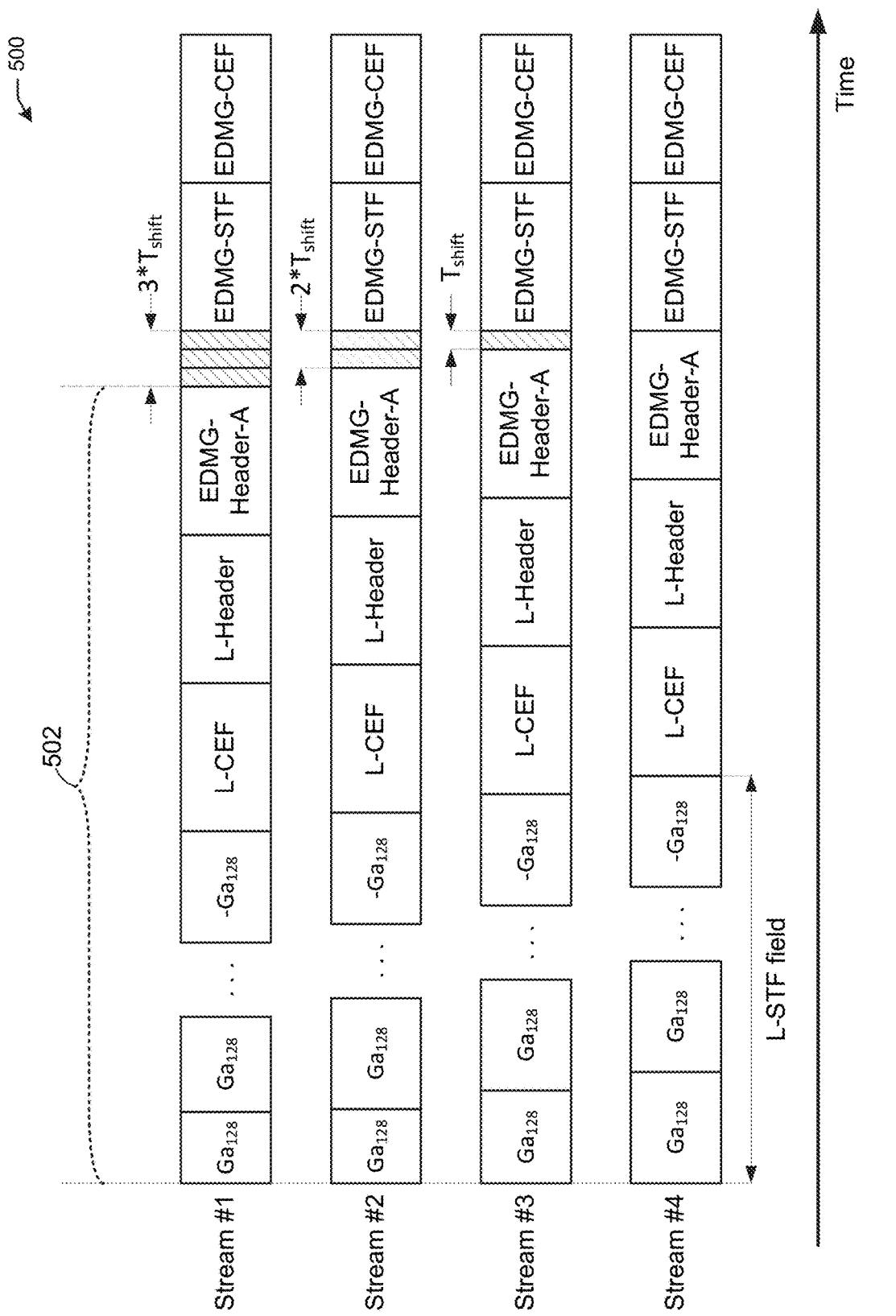
FIG. 5 depicts an illustrative schematic diagram for an enhanced MIMO preamble frame format, in accordance with one or more example embodiments of the present disclosure.

FIG. 5 depicts an illustrative schematic diagram for an enhanced MIMO preamble frame 500, in accordance with one or more example embodiments of the present disclosure.

FIG. 5 shows generalization of the EDMG preamble definition for the 4×N MIMO configuration. In that case, a transmitting device (e.g., the user devices 120 or the AP 102 of FIG. 1) may send an EDMG PPDU to at least one receiving device (e.g., the user devices 120 or the AP 102 of FIG. 1) using four streams (e.g., streams #1-4). The MIMO preamble may include a first section 502, which may be comprised at least in part of the L-STF, L-CEF, L-Header, and EDMG-Header-A fields. As explained above, the L-STF field of the EDMG PPDU may be comprised of Golay sequences. As in FIG. 4, a time shift (Tshift) may be applied to the first portion 502 of at least one of the four streams. For example, the signal (e.g., first section 502) of stream #1 may be shifted by the time duration equal to 3×Tshift, the signal of stream #2 may be shifted by the time duration equal to 2×Tshift, stream #3 may be shifted by Tshift, and stream #4 may not be shifted. This approach may be generalized to an arbitrary MIMO configuration of M×N. The first stream in the general case will be shifted by (M−1)×Tshift and the M-th stream will be not shifted. The size of the time shift may be varied. For example, the Tshift may be an even number in order to have an integer number of samples for the OFDM after a 1.5× sampling rate conversion. In one example, the Tshift may be equal to 4 chips. Other scenarios may be such that any stream may be shifted by a multiple of Tshifts (or no shift at all). In other words, the fields L-STF, L-CEF, L-Header, and EDMG-Header-A in all of the streams may be unsynchronized with each other in order to minimize interference and unintentional beamforming.

In one embodiment, a receiving device may identify the MIMO frame (e.g., the EDMG PPDU). In the example of FIG. 5, the receiving device may determine that the MIMO frame received from stream #1 has a 3×Tshift, such that three portions of the Golay sequence of the L-STF field have been moved to the end of the first section 502 of the MIMO frame. The first portion includes at least in part the L-STF, L-CEF, L-Header, and EDMG-Header-A fields. The receiving device may also determine that the MIMO frame received from stream #2 has a 2×Tshift (e.g., twice the Tshift), stream #3 has only one Tshift, and stream #4 has no shift. Further, the receiving device may determine that the second portion of the MIMO frame that includes, at least in part, EDMG-STF, EDMG-CEF, and other fields that may be included in the MIMO frame, are aligned in time between streams #1, #2, #3, and #4. Based on how the transmitting device determined which stream has how many shifts, the receiving device may be aware of that configuration and may decode or otherwise determine the various Tshifts per stream. It is understood that the above descriptions are for purposes of illustration and are not meant to be limiting.

Figure 6:
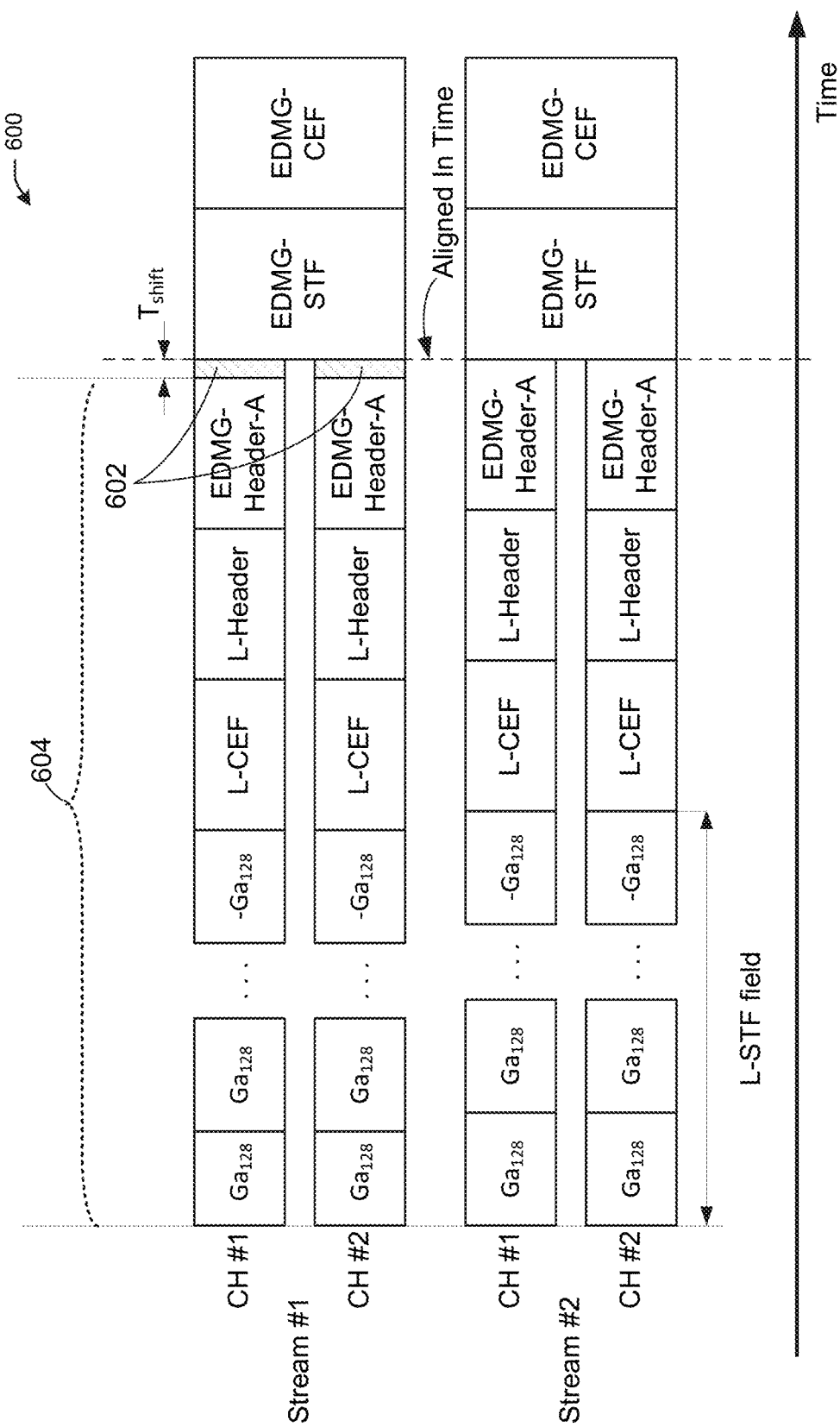
FIG. 6 depicts an illustrative schematic diagram for an enhanced MIMO preamble frame format, in accordance with one or more example embodiments of the present disclosure.

FIG. 6 depicts an illustrative schematic diagram for an enhanced MIMO preamble frame 600, in accordance with one or more example embodiments of the present disclosure.

FIG. 6 shows generalization for the channel 2× bonding case for a 2×N MIMO configuration. In other words, FIG. 6 shows two streams (e.g., stream #1, and stream #2) used for transmission between a transmitting device (e.g., the user devices 120 or the AP 102 of FIG. 1) and at least one receiving device (e.g., the user devices 120 or the AP 102 of FIG. 1). In this example, the stream #1 channel bandwidth is divided into two channels. The same is true for stream #2.

In one embodiment, a time shift (Tshift) may be applied to all channels within a stream. For example, in stream #1, channel #1 has been time shifted by portion 602 having a duration equal to Tshift. Similarly, channel #2 may be time shifted by portion 602 and stream #2.

In one embodiment, the circular time shift may depend on the stream number. It should be understood that although channels #1 and #2 of a stream #1 circular time shift has been applied, the circular time shift may be applied to channels #1 and #2 of stream #2 instead.

In one embodiment, a receiving device may identify the MIMO frame (e.g., the EDMG PPDU). In the example of FIG. 5, the receiving device may determine that the MIMO frame received from stream #1 has a 3*Tshift, such that three portions of the Golay sequence of the L-STF field have been moved to the end of the first section 502 of the MIMO frame. The first portion includes at least in part the L-STF, L-CEF, L-Header, and EDMG-Header-A fields. The receiving device may also determine that the MIMO frame received from stream #2 has a 2×Tshift, stream #3 has a Tshift, and stream #4 has no shift. Further, the receiving device may determine that the second portion of the MIMO frame that includes, at least in part, EDMG-STF, EDMG-CEF, and other fields that may be included in the MIMO frame, are aligned in time between streams #1, #2, #3, and #4.

In one embodiment, a receiving device may identify the MIMO frame (e.g., the EDMG PPDU). The receiving device may determine that a first section (e.g., section 604) of the MIMO frame is received only on a first stream (e.g., stream #1). However, since in this case stream #1 included two frequency channels, the receiving device may decode or otherwise identify that the first section 604 of the MIMO frame is received on the two frequency channels of stream #1. This includes at least in part the L-STF, L-CEF, L-Header, and EDMG-Header-A fields being received on the two frequency channels of stream #1.

The receiving device may determine that the MIMO frame received from stream #1 has a Tshift, such that a portion of the Golay sequence of the L-STF field has been moved to the end of the first section 604 of the MIMO frame. The receiving device may also determine that the Tshift is also applied to all the channels of stream #1, in this case, two channels of stream #1. In the example of FIG. 6, there are two streams. The receiving device may determine that the Tshift is only applied to stream #1 (and its two frequency channels) and not on stream #2. It is understood that the above descriptions are for purposes of illustration and are not meant to be limiting. It should be understood that in some embodiments, stream #1 may not have any Tshift, but instead the other stream #2 has the Tshift. The purpose is to ensure that both streams have an offset portion of the first section 604. However, it should also be noted that the second section of the MIMO frame comprising at least in part the EDMG-STF and the EDMG-CEF field are aligned in time. It is understood that the above descriptions are for purposes of illustration and are not meant to be limiting.

Figure 7A:
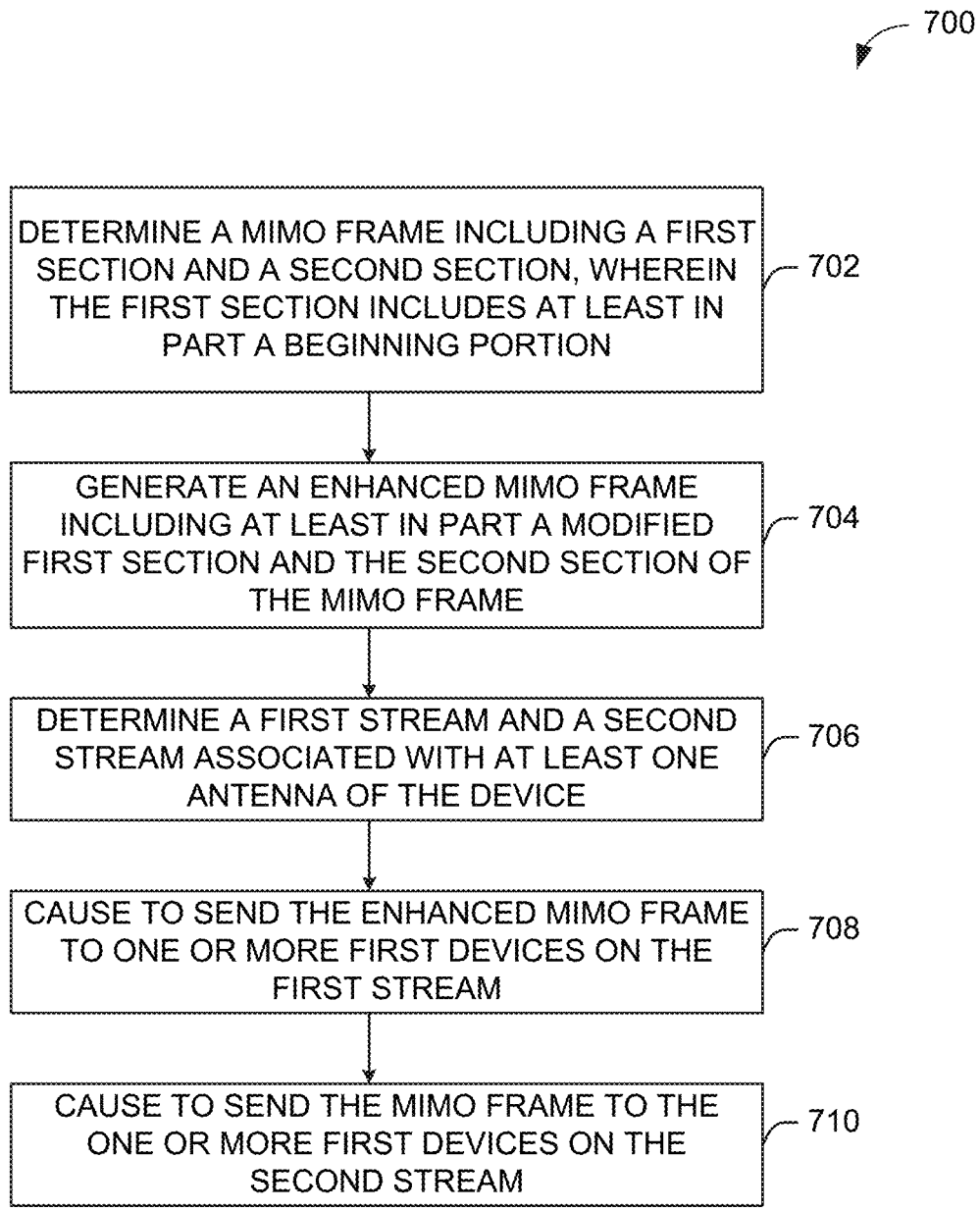
FIG. 7A depicts a flow diagram of an illustrative process for an enhanced MIMO preamble frame format, in accordance with one or more example embodiments of the present disclosure.

FIG. 7A illustrates a flow diagram of an illustrative process 700 for an illustrative enhanced MIMO preamble frame transmission, in accordance with one or more example embodiments of the present disclosure.

At block 702, a device (e.g., the user device(s) 120 and/or the AP 102 of FIG. 1) may determine a multiple input multiple output (MIMO) frame including a first section and a second section, wherein the first section includes at least in part a beginning portion. In the case of one or more streams used during communication between the device and one or more other devices (e.g., the user device(s) 120 and/or the AP 102 of FIG. 1), MIMO frames may be sent using the one or more streams. For example, a MIMO frame (e.g., the EDMG PPDU) may include a first section that may include at least in part a legacy portion (e.g., L-STF, L-Header) and an EDMG-header-A field, and a second section that may include at least in part an EDMG-STF, an EDMG-CEF, and other fields that may be included in the MIMO frame.

At block 704, the device may generate an enhanced MIMO frame including at least in part a modified first section and the second section of the MIMO frame. For example, a time shift may be applied by moving a part of the L-STF field of a MIMO frame in the first section of the MIMO frame of at least one of the one or more streams. The purpose of the time shift is to prevent interference between the antennas and to prevent unintentional beamforming since applying a time shift to some of the MIMO frames in each stream results in an unsynchronized first section with the other streams. The L-STF field may be composed of Golay sequence Ga and/or Gb repetitions. The time shift (Tshift) may be defined in the chip units. The part of the Ga or Gb sequence at the beginning of the first portion of the MIMO frame may be moved to the end after the EDMG-Header-A. Note that starting from the EDMG-STF field the corresponding signals in both streams are aligned in time.

At block 706, the device may determine a first stream and a second stream associated with at least one antenna of the device. In one example in the MIMO communication between the device and the one or more other devices, the device may allocate a first stream using a first antenna and may allocate a second stream using a second antenna. The MIMO frame and the enhanced MIMO frame may be generated to have a time shift (Tshift) as explained above in order to make the first portions of the MIMO frame and the enhanced MIMO frame unsynchronized to minimize interference between the two streams.

At block 708, the device may cause to send the enhanced MIMO frame to one or more first devices on the first stream. For example, the first portion of the enhanced MIMO frame may include the time shift (Tshift) to the portion of the L-STF. The first portion and the second portion of the enhanced MIMO frame may then be sent to one or more other devices.

At block 710, the device may cause to send the MIMO frame to the one or more first devices on the second stream. For example, the first portion and the second portion of the MIMO frame may be sent to one or more other devices without applying a time shift (Tshift). It is understood that the above descriptions are for purposes of illustration and are not meant to be limiting.

Figure 7B:
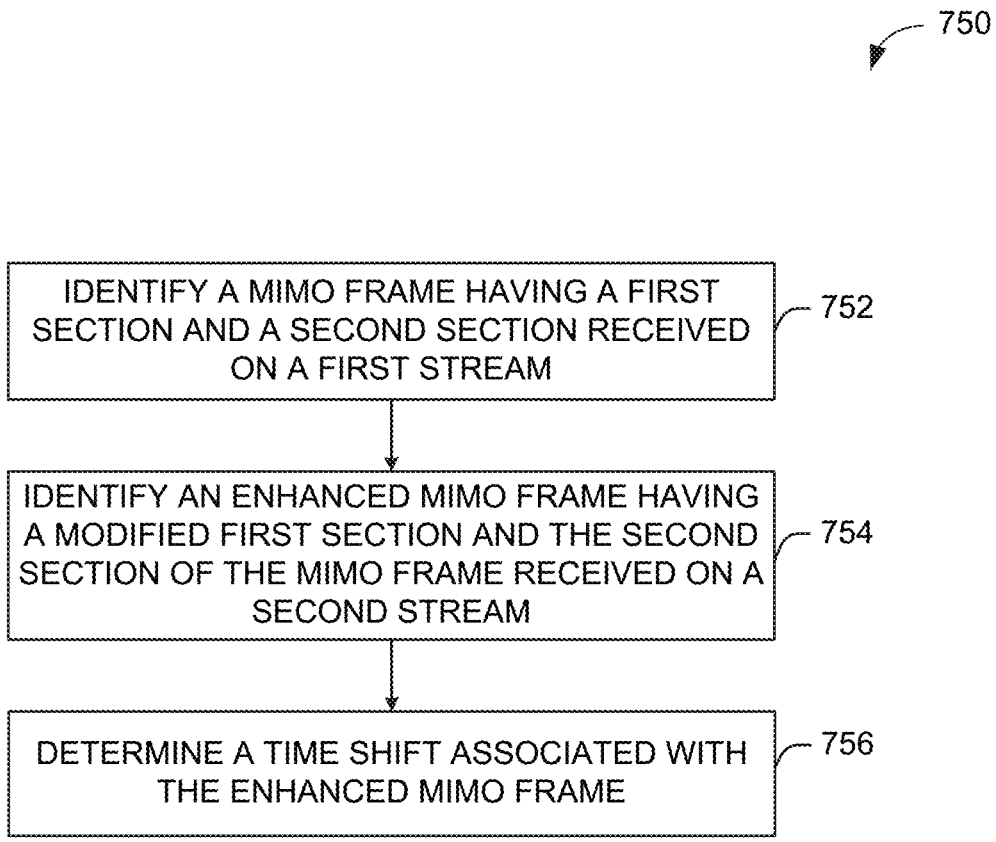
FIG. 7B depicts a flow diagram of an illustrative process for an enhanced MIMO preamble frame format, in accordance with one or more example embodiments of the present disclosure.

FIG. 7B illustrates a flow diagram of an illustrative process 750 for an illustrative enhanced MIMO preamble frame transmission, in accordance with one or more example embodiments of the present disclosure.

At block 752, a device (e.g., the user device(s) 120 and/or the AP 102 of FIG. 1) may identify a MIMO frame having a first section and a second section received on a first stream from another device (e.g., the user device(s) 120 and/or the AP 102 of FIG. 1). For example, the device may determine that a first section of the MIMO frame includes at least in part the L-STF, L-CEF, L-header, and EDMG-header-A fields. Further, the device may determine a second section of the MIMO frame that includes at least in part EDMG-STF, EDMG-CEF, and other fields that may be included in the MIMO frame. The first stream may be associated with a first antenna of the device sending the MIMO frame. The MIMO frame may be received on a first antenna of the device.

At block 754, the device may identify an enhanced MIMO frame having a modified first section and the second section of the MIMO frame received on a second stream. The second stream may be associated with a second antenna of the device sending the MIMO frame. The MIMO frame may be received on a second device receiving the MIMO frame. The device may determine that the first section of the enhanced MIMO frame includes a time shift (Tshift) as compared to the MIMO frame received on the first stream. The time shift of the modified MIMO frame results in minimal interference between the first stream and the second stream. The purpose of the time shift is to prevent interference between the antennas and to prevent unintentional beamforming since each stream is unsynchronized with the other streams. Further, the time shift may not be needed for the single antenna array with orthogonal (V/H) polarizations or dual arrays transmitting with different polarizations.

At block 756, the device may determine a time shift associated with the enhanced MIMO frame. For example, the time shift may be associated with a portion of the Golay sequence of the L-STF field that may be included in the first section of the MIMO frame. The portion of the Golay sequence of the L-STF may be removed from the beginning of the L-STF field and placed to the end of the L-STF field.

Figure 8:
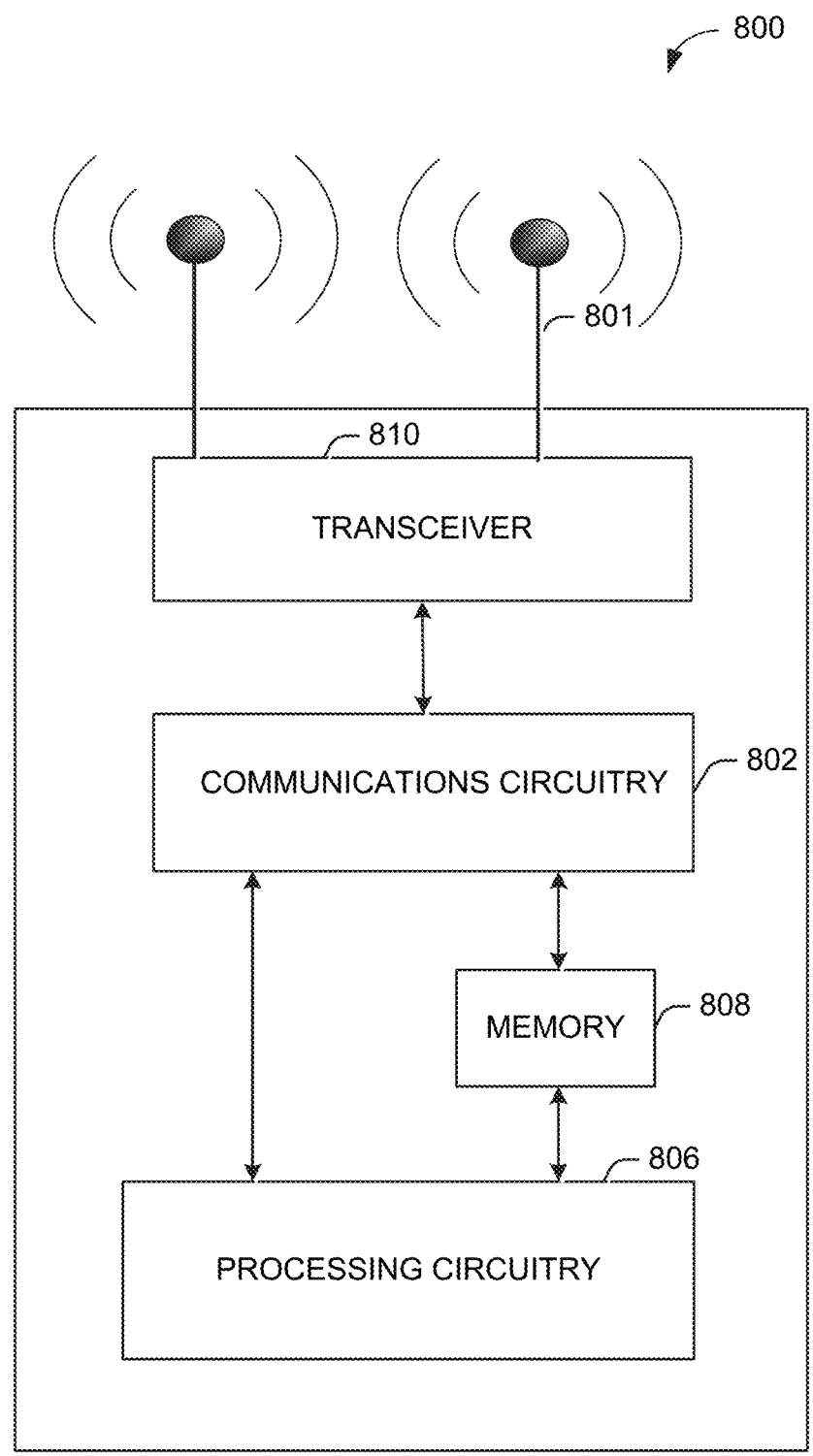
FIG. 8 illustrates a functional diagram of an example communication station that may be suitable for use as a user device, in accordance with one or more example embodiments of the present disclosure.

FIG. 8 shows a functional diagram of an exemplary communication station 800 in accordance with some embodiments. In one embodiment, FIG. 8 illustrates a functional block diagram of a communication station that may be suitable for use as an AP 102 (FIG. 1) or a user device 120 (FIG. 1) in accordance with some embodiments. The communication station 800 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 800 may include communications circuitry 802 and a transceiver 810 for transmitting and receiving signals to and from other communication stations using one or more antennas 801. The communications circuitry 802 may include circuitry that can operate the physical layer (PHY) communications and/or media access control (MAC) communications for controlling access to the wireless medium, and/or any other communications layers for transmitting and receiving signals. The communication station 800 may also include processing circuitry 806 and memory 808 arranged to perform the operations described herein. In some embodiments, the communications circuitry 802 and the processing circuitry 806 may be configured to perform operations detailed in FIGS. 2, 3, 4, 5, 6, 7A and 7B.

In accordance with some embodiments, the communications circuitry 802 may be arranged to contend for a wireless medium and configure frames or packets for communicating over the wireless medium. The communications circuitry 802 may be arranged to transmit and receive signals. The communications circuitry 802 may also include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the communications circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device memory.

Figure 9:
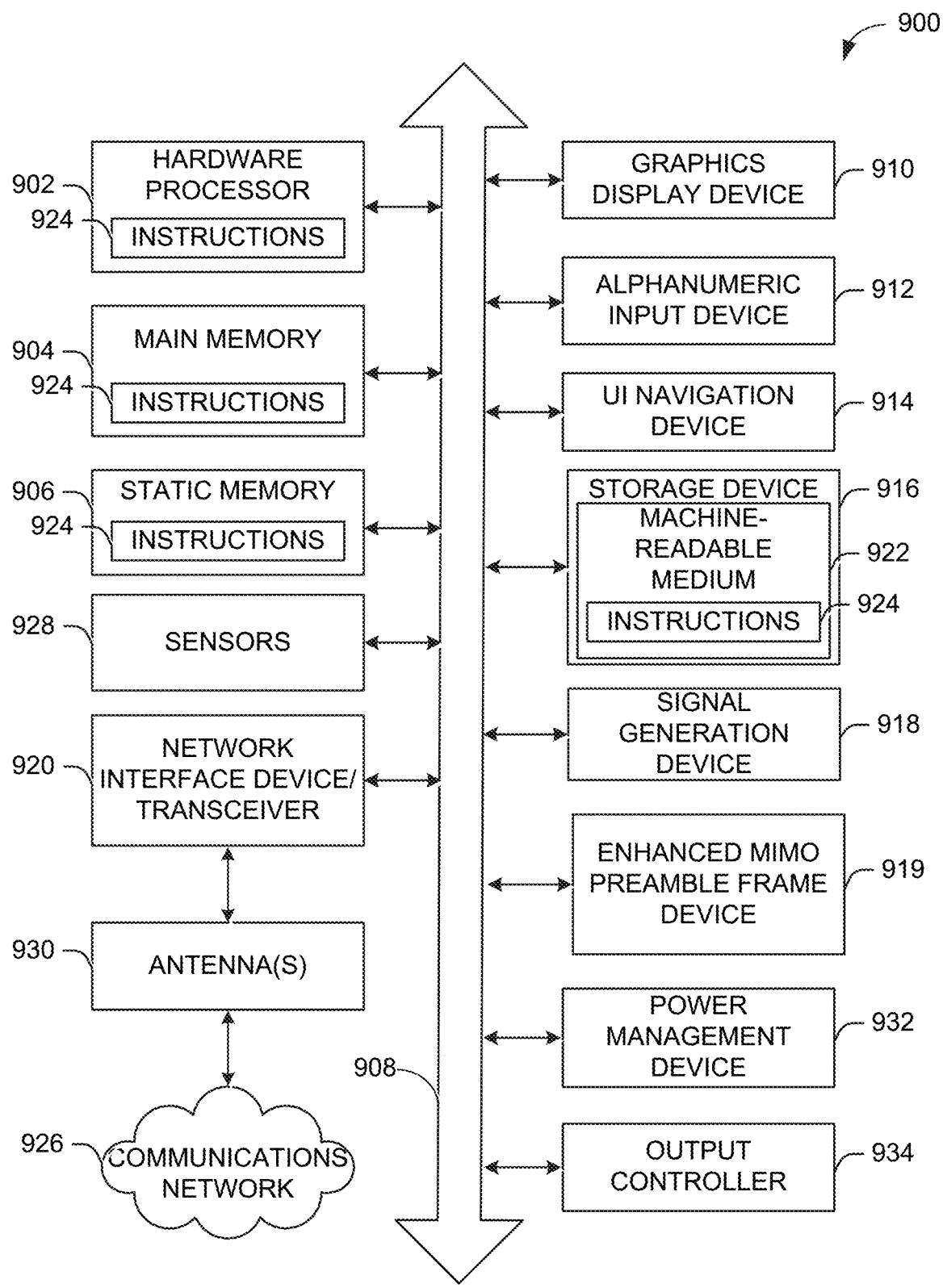
FIG. 9 is a block diagram of an example machine upon which any of one or more techniques (e.g., methods) may be performed, in accordance with one or more example embodiments of the present disclosure.

FIG. 9 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (i.e., drive unit) 916, a signal generation device 918 (e.g., a speaker), an enhanced MIMO preamble frame device 919, a network interface device/transceiver 920 coupled to antenna(s) 930, and one or more sensors 928, such as a global positioning system (GPS) sensor, a compass, an accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

The enhanced MIMO preamble frame device 919 may carry out or perform any of the operations and processes (e.g., the processes 700 and 750) described and shown above. For example, the enhanced MIMO preamble frame device 919 may be configured to define a MIMO preamble frame structure such that it may be used during communications between one or more devices (e.g., access points, user devices, etc.)

The enhanced MIMO preamble frame device 919 may determine a preamble frame format for MIMO such that it may be used during communications between one or more devices (e.g., access points, user devices, etc.) with minimal interference between streams.

The enhanced MIMO preamble frame device 919 may facilitate one or more options that may be defined for the transmission of the legacy part and the EDMG-Header-A using legacy SC modulation from a transmitting device. The selected option may depend at least in part on the antenna type used. In one embodiment, a first option may be to have the legacy L-STF, the L-CEF, the L-Header, and the new EDMG-Header-A transmitted from one of the antennas which has the best beamforming settings (e.g., quality of the link). This option has an advantage for not introducing interference during SISO transmission of the legacy part of the preamble, the L-Header and the EDMG-Header-A. In this case, the legacy L-STF, the L-CEF, and the L-Header would not be transmitted on the other antennas of the transmitting device.

The enhanced MIMO preamble frame device 919 may determine a second option may be to have the legacy L-STF, the L-CEF, the L-Header, and the new EDMG-Header-A transmitted from all antennas of the transmitting device concurrently; however, relative circular shift (Tshift) may be applied to the signals transmitted in different streams. The Tshift selected by a device may be a multiple of chip duration. This may prevent signal interference between different antennas. This option does not introduce a signal "gap" or "quiet" interval at the beginning of the preamble. Further, the introduction of the circular shift prevents the inter-stream interference. However, it may create multipath channel propagation even for the LOS transmission. The interference issue may be solved at the expense of the multipath propagation in that case.

The enhanced MIMO preamble frame device 919 may determine that the Tshift may be a parameter, which may be selected based at least in part on the antenna configuration used for the device. For example, if antennas use orthogonal polarizations, horizontal/vertical (H/V), then the circular shift may be applied equal to zero (e.g., Tshift=0).

The enhanced MIMO preamble frame device 919 may facilitate shifting the signal of a first stream by a first time duration (e.g., Tshift). The signal of a second stream may be shifted by a time duration that may be a multiple of the first time duration. That is, in the case of M streams, each stream may be shifted by (M−1)×Tshift (that is, (M−1) times Tshift).

In the case of a stream that is divided into one or more channels, the enhanced MIMO preamble frame device 919 may facilitate the application of a time shift within the stream for each of its one or more channels.

While the machine-readable medium 922 is illustrated as a single medium, the term "machine-readable medium" may include a single medium or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software. The operations and processes (e.g., the processes 700 and 750) described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

According to example embodiments of the disclosure, there may be a device. The device may include at least one memory that stores computer-executable instructions. The device may further include instructions to determine a multiple input multiple output (MIMO) frame including a first section and a second section. The device may further include instructions to generate an enhanced MIMO frame including at least in part a modified first section and the second section of the MIMO frame. The device may further include instructions to determine a first stream and a second stream associated at least one antenna of the device. The device may further include instructions to cause to send the enhanced MIMO frame to one or more first devices on the first stream. The device may further include instructions to cause to send the MIMO frame to the one or more first devices on the second stream.

The implementations may include one or more of the following features. The MIMO frame is an enhanced directional multi-gigabit (EDMG) frame. The second section may include at least in part an EDMG-STF field, an EDMG-CEF, or an EDMG-header-B. The modified first section may include at least in part, a beginning portion of the first section placed at an end of the first section. The second section of the MIMO frame and the second section of the enhanced MIMO frame are aligned in time. The first section may include at least in part a legacy short training field (L-STF), a legacy channel estimation field (L-CEF), a legacy header (L-Header), or an EDMG-header-A. The L-STF is comprised at least in part of Golay sequences. The beginning portion is part of a circular time shift having a predetermined time duration. The predetermined time duration is equal to four chips. The device may further include a transceiver configured to transmit and receive wireless signals. The device may further include one or more antennas coupled to the transceiver.

According to example embodiments of the disclosure, there may be a device. The device may include at least one memory that stores computer-executable instructions. The device may further include instructions to identify a MIMO frame having a first section and a second section received on a first stream. The device may further include instructions to identify an enhanced MIMO frame having a modified first section and the second section of the MIMO frame received on a second stream. The device may further include instructions to determine a time shift associated with the enhanced MIMO frame.

The implementations may include one or more of the following features. The MIMO frame is an enhanced directional multi-gigabit (EDMG) frame. The MIMO frame include at least in part a legacy short training field (L-STF), a legacy channel estimation field (L-CEF), a legacy header (L-Header), or an EDMG header (EDMG-Header-A). The L-STF is comprised at least in part of Golay sequences. The first section may include at least in part a beginning portion, wherein the beginning portion is part of a circular time shift having a predetermined time duration. The time duration is equal to four chips. The second section may include at least in part an EDMG-STF field, an EDMG-CEF, or an EDMG-header-B. The modified first section may include at least in part, a beginning portion of the first section placed at an end of the first section.

According to example embodiments of the disclosure, there may be a non-transitory computer-readable medium storing computer-executable instructions which, when executed by a processor, cause the processor to perform operations. The operations may include identifying a MIMO frame having a first section and a second section received on a first stream. The operations may include identifying an enhanced MIMO frame having a modified first section and the second section of the MIMO frame received on a second stream. The operations may include determining a time shift associated with the enhanced MIMO frame.

The implementations may include one or more of the following features. The MIMO frame is an enhanced directional multi-gigabit (EDMG) frame. The MIMO frame include at least in part a legacy short training field (L-STF), a legacy channel estimation field (L-CEF), a legacy header (L-Header), or an EDMG header (EDMG-Header-A). The L-STF is comprised at least in part of Golay sequences. The first section may include at least in part a beginning portion, wherein the beginning portion is part of a circular time shift having a predetermined time duration. The time duration is equal to four chips. The second section may include at least in part an EDMG-STF field, an EDMG-CEF, or an EDMG-header-B. The modified first section may include at least in part, a beginning portion of the first section placed at an end of the first section.

According to example embodiments of the disclosure, there may be a non-transitory computer-readable medium storing computer-executable instructions which when executed by one or more processors result in performing operations comprising determining a multiple input multiple output (MIMO) frame including a first section and a second section. The operations may include generating an enhanced MIMO frame including at least in part a modified first section and the second section of the MIMO frame. The operations may include determining a first stream and a second stream associated at least one antenna of a device. The operations may include causing to send the enhanced MIMO frame to one or more first devices on the first stream. The operations may include causing to send the MIMO frame to the one or more first devices on the second stream.

The implementations may include one or more of the following features. The MIMO frame is an enhanced directional multi-gigabit (EDMG) frame. The second section may include at least in part an EDMG-STF field, an EDMG-CEF, or an EDMG-header-B. The modified first section may include at least in part, a beginning portion of the first section placed at an end of the first section. The second section of the MIMO frame and the second section of the enhanced MIMO frame are aligned in time. The first section may include at least in part a legacy short training field (L-STF), a legacy channel estimation field (L-CEF), a legacy header (L-Header), or an EDMG-header-A. The L-STF is comprised at least in part of Golay sequences. The beginning portion is part of a circular time shift having a predetermined time duration. The predetermined time duration is equal to four chips.

According to example embodiments of the disclosure, there may include a method. The method may include determining a multiple input multiple output (MIMO) frame including a first section and a second section. The method may include generating an enhanced MIMO frame including at least in part a modified first section and the second section of the MIMO frame. The method may include determining a first stream and a second stream associated at least one antenna of a device. The method may include causing to send the enhanced MIMO frame to one or more first devices on the first stream. The method may include causing to send the MIMO frame to the one or more first devices on the second stream.

The implementations may include one or more of the following features. The MIMO frame is an enhanced directional multi-gigabit (EDMG) frame. The second section includes at least in part an EDMG-STF field, an EDMG-CEF, or an EDMG-header-B. The modified first section includes at least in part, a beginning portion of the first section placed at an end of the first section. The second section of the MIMO frame and the second section of the enhanced MIMO frame are aligned in time. The first section includes at least in part a legacy short training field (L-STF), a legacy channel estimation field (L-CEF), a legacy header (L-Header), or an EDMG-header-A. The L-STF is comprised at least in part of Golay sequences. The beginning portion is part of a circular time shift having a predetermined time duration.

According to example embodiments of the disclosure, there may include a method. The method may include identifying a MIMO frame having a first section and a second section received on a first stream. The method may include identifying an enhanced MIMO frame having a modified first section and the second section of the MIMO frame received on a second stream. The method may include determining a time shift associated with the enhanced MIMO frame.

The implementations may include one or more of the following features. The MIMO frame is an enhanced directional multi-gigabit (EDMG) frame. The MIMO frame include at least in part a legacy short training field (L-STF), a legacy channel estimation field (L-CEF), a legacy header (L-Header), or an EDMG header (EDMG-Header-A). The L-STF is comprised at least in part of Golay sequences. The first section includes at least in part a beginning portion, wherein the beginning portion is part of a circular time shift having a predetermined time duration. The time duration is equal to four chips. The second section includes at least in part an EDMG-STF field, an EDMG-CEF, or an EDMG-header-B. The modified first section includes at least in part, a beginning portion of the first section placed at an end of the first section.

In example embodiments of the disclosure, there may be an apparatus. The apparatus may include means for determining a multiple input multiple output (MIMO) frame including a first section and a second section. The apparatus may include means for generating an enhanced MIMO frame including at least in part a modified first section and the second section of the MIMO frame. The apparatus may include means for determining a first stream and a second stream associated at least one antenna of the device. The apparatus may include means for causing to send the enhanced MIMO frame to one or more first devices on the first stream. The apparatus may include means for causing to send the MIMO frame to the one or more first devices on the second stream.

The implementations may include one or more of the following features. The MIMO frame is an enhanced directional multi-gigabit (EDMG) frame. The second section includes at least in part an EDMG-STF field, an EDMG-CEF, or an EDMG-header-B. The modified first section includes at least in part, a beginning portion of the first section placed at an end of the first section. The second section of the MIMO frame and the second section of the enhanced MIMO frame are aligned in time. The first section includes at least in part a legacy short training field (L-STF), a legacy channel estimation field (L-CEF), a legacy header (L-Header), or an EDMG-header-A. The L-STF is comprised at least in part of Golay sequences. The beginning portion is part of a circular time shift having a predetermined time duration. The predetermined time duration is equal to four chips.

In example embodiments of the disclosure, there may be an apparatus. The apparatus may include means for identifying a MIMO frame having a first section and a second section received on a first stream. The apparatus may include means for identifying an enhanced MIMO frame having a modified first section and the second section of the MIMO frame received on a second stream. The apparatus may include means for determining a time shift associated with the enhanced MIMO frame.

The implementations may include one or more of the following features. The MIMO frame is an enhanced directional multi-gigabit (EDMG) frame. The MIMO frame include at least in part a legacy short training field (L-STF), a legacy channel estimation field (L-CEF), a legacy header (L-Header), or an EDMG header (EDMG-Header-A). The L-STF is comprised at least in part of Golay sequences. The first section includes at least in part a beginning portion, wherein the beginning portion is part of a circular time shift having a predetermined time duration. The time duration is equal to four chips. The second section includes at least in part an EDMG-STF field, an EDMG-CEF, or an EDMG-header-B. The modified first section includes at least in part, a beginning portion of the first section placed at an end of the first section.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device for transmission of one or more enhanced directional multi-gigabit (EDMG) physical layer protocol data units (PPDUs), the device comprising storage and processing circuitry, the processing circuitry coupled to storage, the processing circuitry configured to:
    determine an EDMG PPDU comprising a first portion, a second portion, and a third portion, wherein the first portion is a pre-EDMG portion, the second portion is an EDMG preamble, and the third portion comprises a least in part a data field and a training field;
    apply a plurality of cyclic time shifts to a plurality of transmit chains, wherein a first cyclic time shift is applied to the first portion of the EDMG PPDU, and wherein
    a second cyclic time shift is applied to the first portion of the EDMG PPDU, wherein the second cyclic time shift is a predetermined multiple of the first cyclic time shift, wherein the predetermined multiple is associated with a number of the plurality of transmit chains;
    cause to send the EDMG PPDU with the first portion having the first cyclic time shift to one or more station devices on a first transmit of the plurality of transmit chains; and
    cause to send the EDMG PPDU with the first portion having the second cyclic time shift to one or more station devices on a second transmit chain of the plurality of transmit chains.

2. The device of claim 1, wherein the first cyclic time shift is associated with the first transmit chain.

3. The device of claim 1, wherein the second cyclic time shift is associated with the second transmit chain.

4. The device of claim 1, wherein the second portion comprises an EDMG-short training field (EDMG-STF), an EDMG-channel estimation field (EDMG-CEF), and an EDMG-Header-B.

5. The device of claim 1, wherein the first portion includes at least in part a legacy short training field (L-STF), a legacy channel estimation field (L-CEF), a legacy header (L-Header), or an EDMG-Header-A.

6. The device of claim 5, wherein the L-STF is comprised at least in part of Golay sequences.

7. The device of claim 1, wherein the first cyclic time shift is based on a chip time duration.

8. The device of claim 1, further comprising a transceiver configured to cause the transmission and reception wireless signals.

9. The device of claim 8, further comprising an antenna coupled to the transceiver cause to send the EDMG PPDU.

10. A non-transitory computer-readable medium storing computer-executable instructions which when executed by one or more processors result in performing operations comprising:
    determine an EDMG PPDU comprising a first portion, a second portion, and a third portion, wherein the first portion is a pre-EDMG portion, the second portion is an EDMG preamble, and the third portion comprises a least in part a data field and a training field;
    apply a plurality of cyclic time shifts to a plurality of transmit chains, wherein a first cyclic time shift is applied to the first portion of the EDMG PPDU, and wherein
    a second cyclic time shift is applied to the first portion of the EDMG PPDU, wherein the second cyclic time shift is a predetermined multiple of the first cyclic time shift, wherein the predetermined multiple is associated with a number of the plurality of transmit chains;
    cause to send the EDMG PPDU with the first portion having the first cyclic time shift to one or more station devices on a first transmit chain of the plurality of transmit chains; and
    cause to send the EDMG PPDU with the first portion having the second cyclic time shift to one or more station devices on a second transmit chain of the plurality of transmit chains.

11. The non-transitory computer-readable medium of claim 10, wherein the first cyclic time shift is associated with the first transmit chain.

12. The non-transitory computer-readable medium of claim 10, wherein the first portion includes at least in part a legacy short training field (L-STF), a legacy channel estimation field (L-CEF), a legacy header (L-Header), or an EDMG header (EDMG-Header-A).

13. The non-transitory computer-readable medium of claim 12, wherein the second portion comprises an EDMG-short training field (EDMG-STF), an EDMG-channel estimation field (EDMG-CEF), and an EDMG-Header-B.

14. The non-transitory computer-readable medium of claim 10, wherein the first cyclic time shift is based on a chip time duration.

15. The non-transitory computer-readable medium of claim 10, wherein the second cyclic time shift is associated with the second transmit chain.

16. A method comprising:
- determining, by one or more processors, an EDMG PPDU comprising a first portion, a second portion, and a third portion, wherein the first portion is a pre-EDMG portion, the second portion is an EDMG preamble, and the third portion comprises a least in part a data field and a training field;
- apply a plurality of cyclic time shifts to a plurality of transmit chains, wherein a first cyclic time shift is applied to the first portion of the EDMG PPDU, and wherein
- a second cyclic time shift is applied to the first portion of the EDMG PPDU, wherein the second cyclic time shift is a predetermined multiple of the first cyclic time shift, wherein the predetermined multiple is associated with a number of the plurality of transmit chains;
- causing to send the EDMG PPDU with the first portion having the first cyclic time shift to one or more station devices on a first transmit chain of the plurality of transmit chains; and
- causing to send the EDMG PPDU with the first portion having the second cyclic time shift to one or more station devices on a second transmit chain of the plurality of transmit chains.

* * * * *